No. 824,845. PATENTED JULY 3, 1906.
W. G. CLARK.
RAIL BOND.
APPLICATION FILED OCT. 13, 1905.
Fig. 1
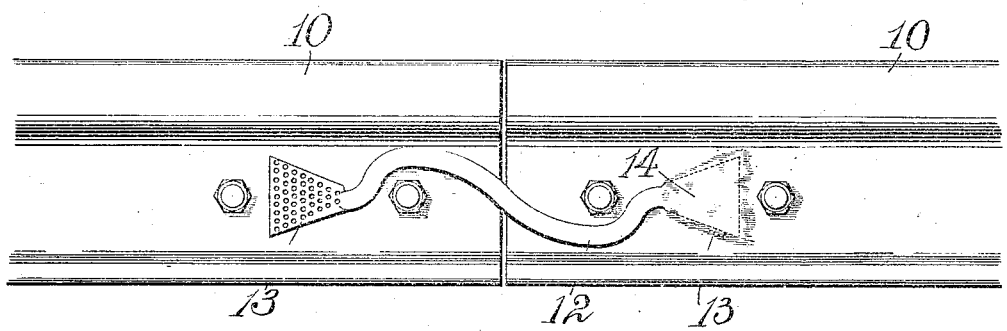
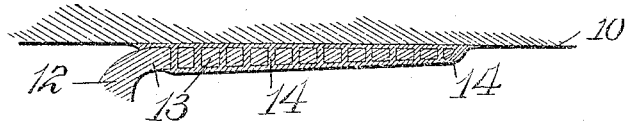
Fig. 2
WITNESSES:
Wm H. Canfield.
Frank L. Stubbs.
INVENTOR.
Walter G. Clark,
BY W. P. Hutchinson,
ATTORNEY.

UNITED STATES PATENT OFFICE.

WALTER G. CLARK, OF SEATTLE, WASHINGTON.

RAIL-BOND.

No. 824,845.  Specification of Letters Patent.  Patented July 3, 1906.

Application filed October 13, 1905. Serial No. 282,559.

*To all whom it may concern:*

Be it known that I, WALTER G. CLARK, of Seattle, in the county of King and State of Washington, have invented a new and Improved Rail-Bond, of which the following is a full, clear, and exact description.

My invention relates to improvements in rail-bonds such as are used to connect adjacent rails of electric railways so as to facilitate the return of the current through the rails.

The object of my invention is to produce a cheap and simple bond which is very flexible and which can be easily, cheaply, and securely fastened to a rail. In many forms of rail-bonds it is necessary to rely on the bolts of the fish-plate or other mechanical fastening to secure the bonds in place, while in other styles of bonds a solder is used as a fastening to secure the bonds to the rails. My invention relates particularly to this last type of bond. In such structures difficulty has been found in making a secure fastening, because, first, a sufficient surface has not been provided, and, lastly, adequate provision has not been made for the escape of gases from the joint when the solder is applied, and so imperfect union has resulted, which has eventually caused the bond to break loose from the rail. My invention obviates this difficulty, and I provide for using a flexible wire, either in a single piece or laminated, and flattening the ends of the wire, so as to get a large thin flat surface which will fit snugly against the web of the rail. This flattened end is pierced by numerous perforations, which serve the double purpose of permitting the ready escape of gases and of affording a splendid gripping-surface for the solder.

With these ends in view my invention consists of a rail-bond the construction of which will be hereinafter clearly described and the novel features claimed.

Reference is to be had to the accompanying drawings, forming a part of this specification, in which similar figures of reference indicate corresponding parts in both the views.

Figure 1 is a side elevation of adjacent rails connected by my improved bond; and Fig. 2 is a longitudinal section through the flattened end of the bond, showing its application to the rail.

The rail 10 can be of any usual kind, such as is used on trolley, other surface, overhead, or subway railways, and adjacent rails are connected by the bond 12, which is preferably a copper wire and which can be either a single strand or laminated, as preferred. The ends of the bond 12 are flattened out by rolling or hammering, as shown at 13, so as to produce a large thin fan-shaped surface, though the particular configuration of this surface is not very essential. It is better, however, to have the flattened end thinned toward its extremity, as shown, as this causes the said end to expand laterally to the fan shape illustrated, and thus an extremely large surface is afforded which fits snugly against the web of the rail. The flattened end 13 is pierced transversely by numerous perforations, as shown, so that when the solder 14 is applied at the junction of the bond end and rail the solder fills the perforations and covers the surface of the bond end, thereby tying the latter very securely to the rail, while at the same time the gases produced by the act of soldering can bubble out through the perforations and escape.

It will be observed that by the structure described I am enabled to use a very flexible bond 12 and that the bond can be very easily, quickly, and securely attached to a rail. It will be further observed that the large flat surface described besides making a secure connection affords a particularly good contact, so that the current will pass without loss from rail to rail. It will be further understood that while the thin and fan-shaped end described is preferable I do not limit myself to this particular form of end for the bond, and, as above stated, it will be clear that the body portion of the bond can be of any preferred kind.

It will be obvious that the form of bond which I have shown and described can be used without having the ends perforated; but the result in such cases will not be so satisfactory, as there is not so good a gripping-surface and the gas cannot escape so well.

Having thus fully described my invention, I claim as new and desire to secure by Letters Patent—

1. A single-piece rail-bond formed of a flexible body having integral end portions which are flattened and each provided with a plurality of perforations.

2. A single-piece rail-bond formed of a flexible body having integral end portions which are flattened, widened, thinned and perforated.

3. A rail-bond comprising a flexible body terminating at the ends in widened portions which are gradually thinned toward the extremities and are provided with a plurality of perforations.

WALTER G. CLARK.

Witnesses:
WARREN B. HUTCHINSON,
FRANK L. STUBBS.